(No Model.) 2 Sheets—Sheet 1.

H. F. CONDON.
VETERINARY MOUTH SPECULUM.

No. 551,462. Patented Dec. 17, 1895.

Witnesses,

Inventor,
Henry F. Condon
By Offield Towle & Linthicum
Attys.

(No Model.) 2 Sheets—Sheet 2.
H. F. CONDON.
VETERINARY MOUTH SPECULUM.
No. 551,462. Patented Dec. 17, 1895.
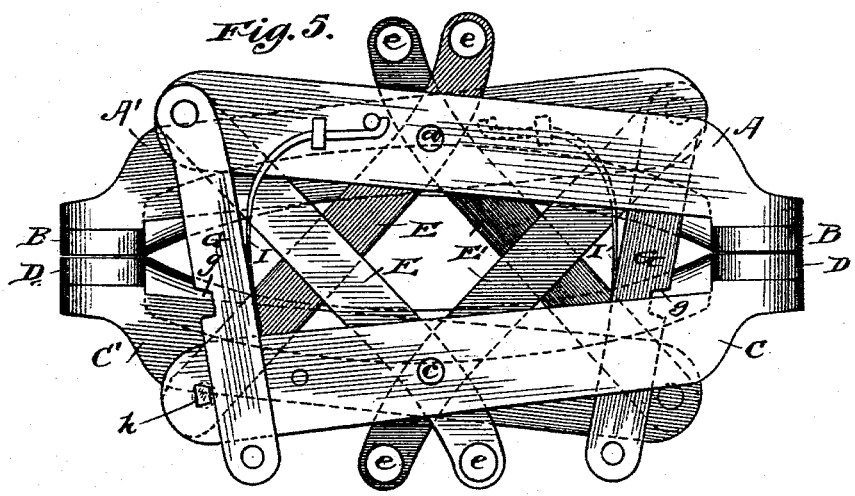
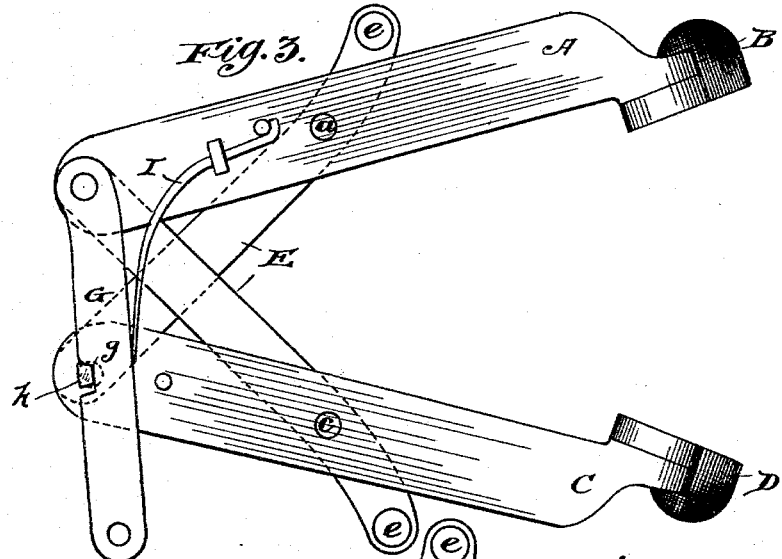
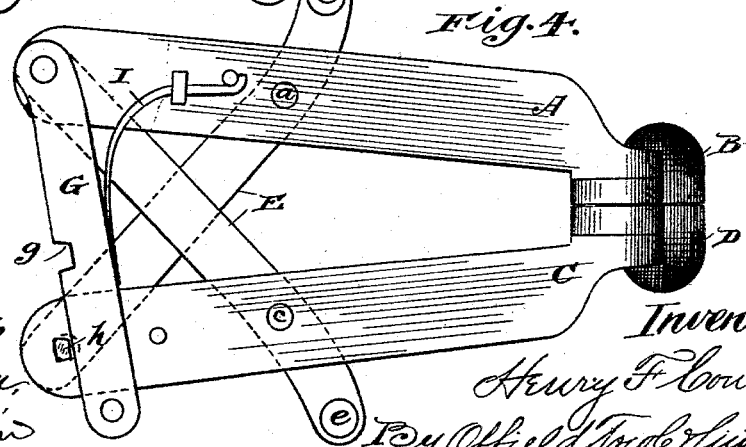
Witnesses: Inventor,
Henry F. Condon
By Offield Towle Linthicum
Att'ys.

UNITED STATES PATENT OFFICE.

HENRY F. CONDON, OF DE KALB, ILLINOIS, ASSIGNOR OF ONE-HALF TO JOSEPH F. GLIDDEN, OF SAME PLACE.

VETERINARY MOUTH-SPECULUM.

SPECIFICATION forming part of Letters Patent No. 551,462, dated December 17, 1895.

Application filed October 20, 1894. Serial No. 526,455. (No model.)

*To all whom it may concern:*

Be it known that I, HENRY F. CONDON, of De Kalb, Illinois, have invented certain new and useful Improvements in Veterinary Mouth-Speculums, of which the following is a specification.

This invention relates to a speculum which is intended for use in veterinary operations upon animals, such as in administering medicine or in working upon the teeth.

The object of the invention is to provide an instrument which can be readily and conveniently applied and by which the mouth of the animal may be sufficiently distended to permit the desired operations, while leaving the mouth unobstructed on the sides as well as in front.

The instrument is so made that when not in use it can be compactly folded and may be carried in an overcoat-pocket.

To this end my invention consists in an instrument of the class described, comprising two pairs of jaws, each pair connected at the forward ends by spreader-bars, the connection being preferably pivotal, so as to permit the jaws to be folded or collapsed, in combination with diagonally-arranged levers which pivotally connect the upper and lower jaws on each side together, and a locking device applied to the jaws, preferably at their rear ends.

Figure 1:
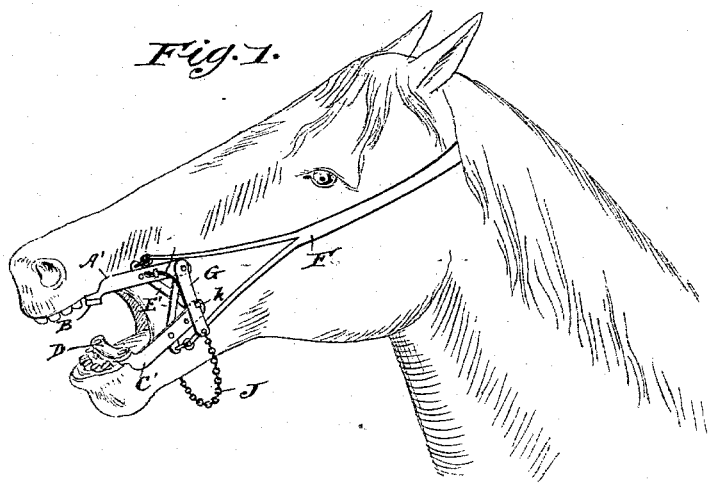
Figure 2:
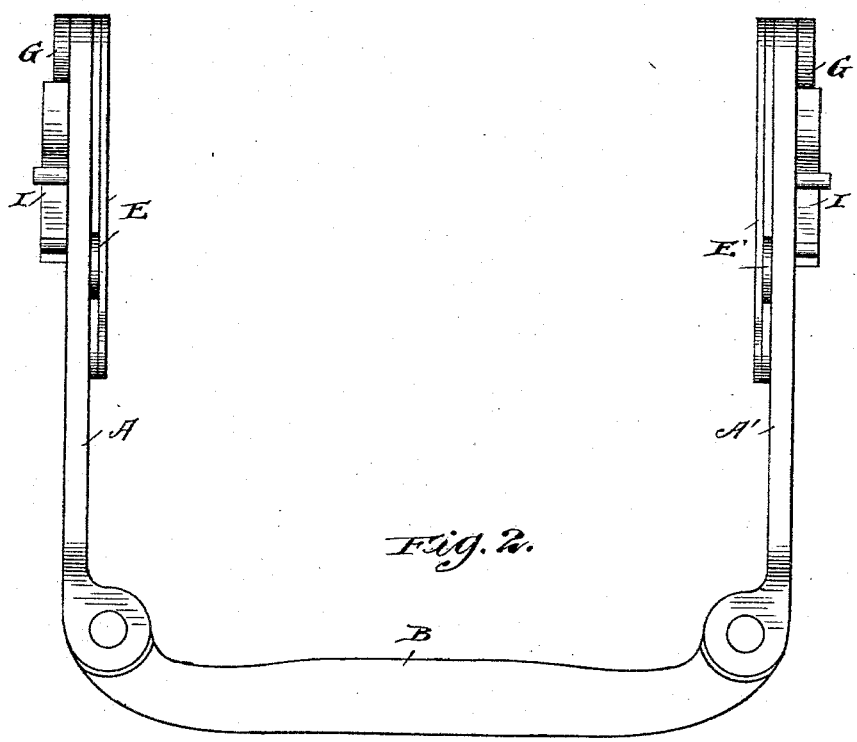

In the accompanying drawings, Figure 1 is a perspective view showing the speculum applied. Fig. 2 is a top or plan view. Fig. 3 is an elevation showing the speculum open. Fig. 4 shows it closed or in position for application, and Fig. 5 shows it folded or collapsed.

In the drawings, A A' represent the upper jaws, which are pivotally connected at their forward ends to a spreader-bar B.

C C' represent lower jaws, which are likewise pivotally connected at their forward ends to a lower spreader-bar D.

E represents levers, arranged diagonally to each other and pivotally connected at their rear ends to the jaws A C near the rear ends of the latter, while the forward ends of said levers are connected, respectively, to the jaws A C by the pivots $a$ $c$. The forward ends of said levers are preferably extended beyond their pivotal connections $a$ $c$, the extended ends being perforated, as seen at $e$, to receive the straps or branches of a head-stall F. The jaws A' C' are similarly connected by levers E'.

G represents a locking-bar having one or more locking-notches $g$ adapted to engage a pin or other stop $h$, which may be the rear pivot of one of the levers E, the upper end of the locking-bar being carried by the rear pivot of the other of said levers. A spring I is arranged to bear upon the locking lever or pawl.

When the instrument is opened to the position shown in Fig. 3, the spreader-bars and the forward ends of the upper and lower jaws separate while the rear ends of the jaws approach each other and the locking-bar engages the lock-pin, thus locking them in the open position. The locking mechanisms may be duplicated, one for each side, and the locking-levers may be provided with a chain J by which they may be detached simultaneously.

The instrument is applied in the same manner as a bridle with the locking-bars close together until they have entered the animal's mouth and passed behind the incisors. As the animal opens its mouth, or as the mouth is forced open, and the spreader-bars separated the locking-bar will engage and thus the mouth will be held in the distended position, leaving the front and sides of the mouth open. It will be observed that in this construction the rear ends of the jaws do not when in the position of use come together, and therefore the mouth may be opened as wide as necessary without unduly separating the spreader-bars and with a comparatively small or slight movement of the rear ends of the jaws. With this instrument, therefore, the jaws may be made straight, and I prefer to so make them on account of economy of manufacture. All of the parts of the instrument, when of the form shown, may be punched out from steel bars of suitable thickness and width and an exceedingly strong, durable and cheap instrument can thus be provided.

It is the object of my invention, primarily, to furnish an instrument at such low cost that it will be taken out of the class of surgical appliances and placed within the reach of stock-owners generally. It has of late years been determined that cattle as well as horses frequently require operations upon the teeth and the administration of medicines, and my invention is designed to produce a cheap but effective instrument to fill this large field of usefulness.

I have found that the arrangement of levers above described affords the desired range of movements and adjustments, and that the operation of this instrument is exceedingly simple, while it is constructed so that it will not unduly excite the animal when putting it in position, and when not in use it may be compactly folded by first closing it to the position shown in Fig. 4, and afterward folding the jaws upon each other, as seen in Fig. 5.

Obviously the locking mechanism may be modified in construction and changed as to location, and I do not therefore limit my invention to the precise structural details shown.

I claim—

1. A veterinary mouth speculum, comprising in combination upper and lower jaws, spreader bars pivotally connecting said jaws in pairs at their forward ends, levers pivoted to said jaws at their rear ends and said levers crossing each other and being pivotally connected to the upper and lower jaws between their ends, substantially as described.

2. A veterinary mouth speculum, comprising in combination upper and lower jaws, spreader bars pivotally connecting said jaws at their forward ends, levers pivotally connecting the upper and lower jaws together, said levers being arranged to cross each other and having their forward ends extended for connection to a head stall, substantially as described.

3. A veterinary mouth speculum, comprising in combination upper and lower jaws having substantially straight bodies, spreader bars pivotally connecting said jaws in pairs, diagonally arranged levers two for each side crossing each other and connecting an upper and a lower jaw pivotally together and a locking device applied to the rear ends of said jaws, substantially as described.

HENRY F. CONDON.

Witnesses:
GEO. D. O'BRIEN,
CHAS. ROBINSON.